United States Patent
Nakaoki et al.

(10) Patent No.: US 6,243,327 B1
(45) Date of Patent: Jun. 5, 2001

(54) MAGNETO-OPTICAL DISK SYSTEM HAVING A RELATION BETWEEN A NUMERICAL APERTURE OF AN OBJECTIVE LENS AND THE THICKNESS OF A COVER LAYER

(75) Inventors: Ariyoshi Nakaoki, Tokyo; Kimihiro Saito, Saitama, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/473,657

(22) Filed: Dec. 29, 1999

(30) Foreign Application Priority Data

Jan. 8, 1999 (JP) .................................................. 11-003208

(51) Int. Cl.⁷ .................................................... G11B 11/00
(52) U.S. Cl. ............................................................... 369/13
(58) Field of Search ............................... 369/13, 14, 112, 369/110, 116, 275.5, 283; 360/59, 114

(56) References Cited

U.S. PATENT DOCUMENTS

| | | | |
|---|---|---|---|
| 4,449,138 | * | 5/1984 | Ando ................................ 430/270.11 |
| 5,276,674 | * | 1/1994 | Tanaka ................................. 369/275.3 |
| 5,392,263 | * | 2/1995 | Watanabe et al. ........................ 369/13 |
| 5,587,990 | * | 12/1996 | Watanabe et al. .................. 369/275.2 |
| 5,838,646 | * | 11/1998 | Watanabe et al. ........................ 369/13 |
| 6,023,451 | * | 2/2000 | Kashiwagi et al. ................ 369/275.5 |
| 6,078,560 | * | 6/2000 | Kashiwagi ........................ 369/275.5 |

* cited by examiner

*Primary Examiner*—Tan Dinh
(74) *Attorney, Agent, or Firm*—Sonnenschein, Nath & Rosenthal

(57) ABSTRACT

The object of the present invention is to improve the accuracy of a recording signal and a reproduction signal of a magneto-optical recording medium. In a magneto-optical recording medium (2) having at least a metallic reflection layer (3), a back dielectric layer (4), a magneto-optical recording layer (5) and a light transmitting dielectric layer (6) sequentially provided on a substrate (8), the thickness of the light transmitting dielectric layer (6) closer to a convergent lens (1) is set at 50 to 80 nm. Alternatively, the refraction index n of the light transmitting dielectric layer (6) is selected to satisfy the relationship of $n_0 \times 0.8 \leq n$ with the refraction index $n_0$ of the convergent lens (1).

18 Claims, 13 Drawing Sheets

US 6,243,327 B1

MAGNETO-OPTICAL DISK SYSTEM HAVING A RELATION BETWEEN A NUMERICAL APERTURE OF AN OBJECTIVE LENS AND THE THICKNESS OF A COVER LAYER

RELATED APPLICATION DATA

The present application claims priority to Japanese Application No. P11-003208 filed Jan. 8, 1999, which application is incorporated herein by reference to the extent permitted by law.

BACKGROUND OF THE INVENTION

1. Technical Field

The present invention particularly relates to a magneto-optical recording medium for which at least one of recording and reproduction is conducted by irradiating a light onto the magneto-optical recording medium, an optical head for conducting at least one of recording and reproduction by irradiating a light and a recording and reproducing apparatus comprising the optical head.

2. Description of the Related Art

FIG. 16 is a schematic cross-sectional view of an example of a conventional magneto-optical recording medium for which recording or reproduction is conducted by irradiating a light onto the medium and a manner of light irradiation.

In this conventional magneto-optical recording medium 100, the first dielectric layer 102 made of, for example, SiN and the like, an information recording layer 103 consisting of a magnetic film made of, for example, TbFeCo and the like, the first dielectric layer 104 made of, for example, SiN and the like and a reflection layer 105 made of, for example, Al and the like are sequentially provided on a substrate 101. A protective layer 107 made of, for example, ultraviolet hardened resin and the like is formed on the reflection layer 105.

An information signal is written in the magneto-optical recording medium 100 shown in FIG. 16 in the magnetization direction of the magnetic film 103. When an information signal is recorded and reproduced, an incidence of a laser light L is carried out from the substrate 101 side as shown in FIG. 16.

In case of reading the signal recorded on the magneto-optical recording medium 100 shown in FIG. 16, a laser light L is incident on an objective lens 124 from a laser light source 121 through a collimator lens 122 and a beam splitter 123 in a recording and reproducing apparatus 120 as shown in FIG. 17.

Here, it is assumed that the laser light incident on the objective lens 124 is a linear polarized light, whose polarization direction is shown in FIG. 18.

The laser light L incident on the objective lens 124 is converged onto the information recording layer 103 of the magneto-optical recording medium 100 by the objective lens 124.

The convergent light is reflected and the polarization state of the reflected light is changed by the Kerr effect from the information recording layer 103.

The polarization direction of the reflected light is shown in FIG. 19.

As shown in FIGS. 18 and 19, the polarization direction of a return light reflected by the recording medium and returned from the objective lens 124 varies depending on a magnetization direction according to the information recorded on the information recording layer 103.

As shown in FIG. 17, the return light is passed through the objective lens 124 again, incident on the beam splitter 123, reflected by the beam splitter 123 and fetched.

The return light reflected by the beam splitter 123 and fetched is first incident on a half-wave plate 125 and the polarization direction of the return light is rotated.

Next, the return light is incident on and split by a polarization beam splitter 126 into two polarization components having polarization directions perpendicular to each other. Among them, the polarization component transmitted by the polarization beam splitter 126 is detected by the first photo-detector 127 and that reflected by the polarization beam splitter 126 is detected by the second photo-detector 128.

In such a system for recording and reproducing the information on a magneto-optical recording medium, it is effective to increase the numerical aperture N. A. of the objective lens for converging a laser light L used for recording and reproduction, to thereby reduce the spot diameter of the light converged by the objective lens and to enhance resolution for the purpose of increasing recording density.

Here, it is assumed that the spot diameter of the light converged by the objective lens is generally expressed as $\lambda/N.A.$ where $\lambda$ is the wavelength of a laser light used for recording and reproduction and N. A. is the numerical aperture of the objective lens.

The numerical aperture N. A. of the objective lens is expressed as $n_0 \cdot \sin\theta$ where $n_0$ is the refractive index of a medium and $\theta$ is the angle of the peripheral light beam of the objective lens. Obviously, therefore, if air is the medium (i.e., $n_0=1$), the numerical aperture of the objective lens N. A. does not exceed 1.

As a technique for exceeding the limit, there is proposed a recording and reproducing apparatus using a solid immersion light. The solid immersion lens is supported by and opposite to the magneto-optical recording medium at a distance of less than the wavelength of a light used for recording and reproduction. In the recording and reproducing apparatus using the solid immersion lens, a convergent light is incident on the solid immersion lens and most parts of the incident beams are totally reflected on the end face of the solid immersion lens. Utilizing a so-called evanescent light effused from the end face of the solid immersion lens, the information is recorded on and reproduced from the magneto-optical recording medium. At this time, if a medium having a refractive index $n_0$ of greater than 1 is used for the solid immersion lens, the numerical aperture N. A. can be made not less than 1.

However, as stated above, if information is recorded on and reproduced from the magneto-optical recording medium using an evanescent light, the light propagated into the magneto-optical recording medium is different in property from a light conventionally applied to information recording or reproduction by the magneto-optical recording medium. Due to this, for example, enhancement conditions of a multilayer structure combined with a transparent dielectric cannot be applied or the information on the phase of the light differs from the incidence direction when a linear polarized light is incident on the medium. As a result, the quality of the reproduced signal disadvantageously deteriorates.

SUMMARY OF THE INVENTION

Under the circumstances, the present invention has been made. It is, therefore, an object of the present invention to provide a magneto-optical recording medium, an optical head and a recording and reproducing apparatus which allows detection of a high quality signal from a return light reflected by and returned from the magneto-optical recording medium while utilizing a solid immersion lens.

A magneto-optical recording medium according to the present invention is characterized in that at least one of recording and reproduction is conducted with respect to the magneto-optical recording medium by irradiating a light onto the magneto-optical recording medium through a convergent lens having a numerical aperture (N. A.) of not less than 1, the magneto-optical recording medium has at least a metallic reflection layer, a back dielectric layer, a magneto-optical recording layer and a light transmitting dielectric layer sequentially provided on a substrate, and is irradiated with the light from a side of the light transmitting dielectric layer; and the light transmitting dielectric layer has a thickness of 50 to 80 nm.

Also, a magneto-optical recording medium according to the present invention is characterized in that at least one of recording and reproduction is conducted with respect to the magneto-optical recording medium by irradiating a light onto the magneto-optical recording medium through a convergent lens having a numerical aperture (N. A.) of not less than 1, the magneto-optical recording medium has at least a metallic reflection layer, a back dielectric layer, a magneto-optical recording layer and a light transmitting dielectric layer sequentially provided on a substrate; and a refraction index n of the light transmitting dielectric layer is selected to satisfy a relationship of $n_0 \times 0.8 \leq n$ with a refraction index $n_0$ of the convergent lens.

Further, an optical head according to the present invention is characterized in that the optical head includes a convergent lens having a numerical aperture (N. A.) of not less than 1; and the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, by irradiating a light onto the magneto-optical recording medium from a side of the light transmitting dielectric layer through the convergent lens.

Moreover, an optical head according to the present invention is characterized in that the optical head includes a convergent lens having a numerical aperture (N. A.) of not less than 1; and that the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, a refraction index n of the light transmitting dielectric layer selected to satisfy a relationship of $n_0 \times 0.8 \leq n$ with a refraction index $n_0$ of the convergent lens, by irradiating a light onto the magneto-optical recording medium from a side of the light transmitting dielectric layer through the convergent lens.

Further, a recording and reproducing apparatus according to the present invention is characterized in that the apparatus comprises an optical head including a convergent lens having a numerical aperture (N. A.) of not less than 1; and the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, by irradiating a light onto the magneto-optical recording medium having the light transmitting dielectric layer of the thickness of 50 to 80 nm from a side of the light transmitting dielectric layer through the convergent lens.

Additionally, a recording and reproducing apparatus according to the present invention is characterized in that the apparatus comprises an optical head including a convergent lens having a numerical aperture (N. A.) of not less than 1; and the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, a refraction index n of the light transmitting dielectric layer selected to satisfy a relationship of $n_0 \times 0.8 < n$ with a refraction index $n_0$ of the convergent lens, by irradiating a light onto the magneto-optical recording medium from a side of the light transmitting dielectric layer through the convergent lens.

According to the magneto-optical recording medium, the optical head and the recording and reproducing apparatus of the present invention, it is possible to detect a high quality signal from a return light reflected by and returned from the magneto-optical recording medium.

DETAILED DESCRIPTION OF THE PREFERRED EMBODIMENT

Figure 1:
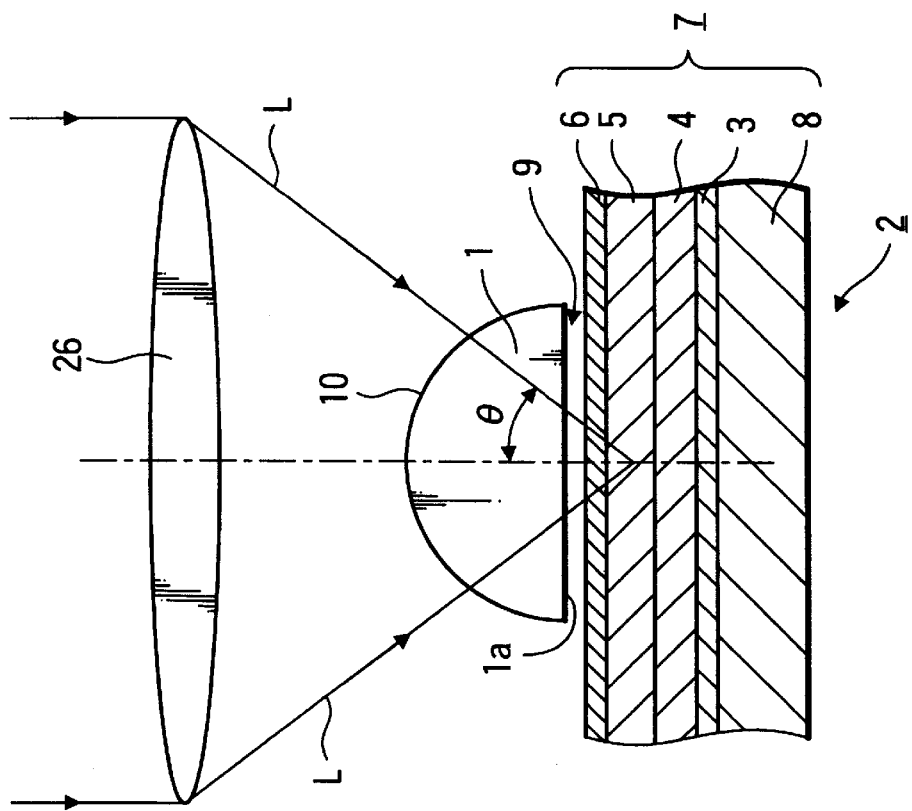
FIG. 1 is a schematic cross-sectional view of a magneto-optical recording medium according to the present invention.

A magneto-optical recording medium according to the present invention is characterized in that at least one of recording and reproduction is conducted with respect to the magneto-optical recording medium by irradiating a light onto the magneto-optical recording medium through a convergent lens having a numerical aperture (N. A.) of not less than 1, the magneto-optical recording medium has at least a metallic reflection layer, a back dielectric layer, a magneto-optical recording layer and a light transmitting dielectric layer sequentially provided on a substrate; and is irradiated with the light from a side of the light transmitting dielectric layer; and the light transmitting dielectric layer has a thickness of 50 to 80 nm.

Also, a magneto-optical recording medium according to the present invention is characterized in that at least one of recording and reproduction is conducted with respect to the magneto-optical recording medium by irradiating a light onto the magneto-optical recording medium through a convergent lens having a numerical aperture (N. A.) of not less than 1, the magneto-optical recording medium has at least a metallic reflection layer, a back dielectric layer, a magneto-optical recording layer and a light transmitting dielectric layer sequentially provided on a substrate; and a refraction index n of the light transmitting dielectric layer is selected to satisfy a relationship of $n_0 \times 0.8 \leq n$ with a refraction index $n_0$ of the convergent lens.

Further, an optical head according to the present invention is characterized in that the optical head includes a convergent lens having a numerical aperture (N. A.) of not less than 1; and the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, by irradiating a light onto the magneto-optical recording medium from a side of the light transmitting dielectric layer through the convergent lens.

Moreover, an optical head according to the present invention is characterized in that the optical head includes a convergent lens having a numerical aperture (N. A.) of not less than 1; and in that the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, a refraction index n of the light transmitting dielectric layer selected to satisfy a relationship of $n_0 \times 0.8 \leq n$ with a refraction index $n_0$ of the convergent lens, by irradiating a light onto the magneto-optical recording medium from a side of the light transmitting dielectric layer through the convergent lens.

Further, a recording and reproducing apparatus according to the present invention is characterized in that the apparatus comprises an optical head including a convergent lens having a numerical aperture (N. A.) of not less than 1; and the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, by irradiating a light onto the magneto-optical recording medium having the light transmitting dielectric layer of the thickness of 50 to 80 nm from a side of the light transmitting dielectric layer through the convergent lens.

Additionally, a recording and reproducing apparatus according to the present invention is characterized in that the apparatus comprises an optical head including a convergent lens having a numerical aperture (N. A.) of not less than 1; and the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, a refraction index n of the light transmitting dielectric layer selected to satisfy a relationship of $n_0 \times 0.8 \leq n$ with a refraction index $n_0$ of the convergent lens, by irradiating a light onto the magneto-optical recording medium from a side of the light transmitting dielectric layer through the convergent lens.

Now, examples of a magneto-optical recording medium, an optical head and a recording and reproducing apparatus according to the present invention will be described. It is noted, however, that the present invention should not be limited to the examples.

The following examples concern an optical recording medium, an optical head and a recording and reproducing apparatus comprising the optical head for conducting recording and reproduction using a solid immersion lens (SIL) as a convergent lens arranged at a position proximate to the magneto-optical recording medium.

As shown in FIG. 1, a solid immersion lens (SIL) is used as a convergent lens 1 and an air gap, i.e., an air layer 9 is present between the convergent lens 1 and a magneto-optical recording medium 2.

The magneto-optical recording medium 2 is formed by providing a multilayer optical thin film 7 having a metallic reflection layer 3 made of, for example, Al or Ag, a back dielectric layer 4 made of, for example, $Si_3N_4$, an information recording layer 5 made of a magnetic member such as, for example, TbFeCo or GdFeCo and a light transmitting dielectric layer 6 made of, for example, SiN provided in this order on a substrate 8 made of, for example, polycarbonate by means of sputtering or the like.

Applicable materials for the substrate 8 include conventionally known materials such as metal of, for example, Al and Si as well as transparent materials to an irradiation light such as glass and polycarbonate.

Applicable materials for the metallic reflection layer 3 include those having high thermal conductivity such as Au and Cu as well as Al and Ag.

In the magneto-optical recording medium 2 shown in FIG. 1, a laser light L is made incident from the light transmitting dielectric layer 6 side opposite to the substrate 8 so as to narrow the distance between the multilayer optical thin film 7 and an objective lens 1.

It is also possible to form a protective film made of ultraviolet hardened resin on the multilayer optical thin film 7.

The thicknesses of the respective layers constituting the magneto-optical recording medium 2 in the example shown in FIG. 1 are set such that the metallic reflection layer 3 is 50 [nm] thick, the back dielectric layer 4 is 40 [nm] thick, the information recording layer 5 made of, for example, TbFeCo is 15 to 30 [nm], e.g., 25 [nm], for example, thickness.

It is noted that this information recording layer 5 can be formed to have a thickness of 15 to 30 [nm] by providing a plurality of layers such as a TbFeCo layer and a GdFeCo layer which are, for example, 15 [nm] and 10 [nm] thick, respectively.

The light transmitting dielectric layer 6 on the information recording layer 5 is formed to have a thickness of 50 to 80 [nm], preferably 70 [nm].

The refraction index n of the light transmitting dielectric layer 6 is set to have a relationship with the refraction index $n_0$ of the convergent lens, i.e., to satisfy $n_0 \times 0.8 \leq n$.

The light incidence surface 10 of the convergent lens 1, i.e., solid immersion lens is generally spherical. Due to this, a light incident on the convergent lens 1 at a certain angle from the air passes through the convergent lens 1 while keeping the angle.

At this time, if a lens having a refraction index $n_0$ of greater than 1 is used as the solid immersion lens, the numerical aperture N. A. (=$n_0 \cdot \sin\theta$) of the lens can be made greater than 1 even with the angle $\theta$ of a peripheral light beam incident on the convergent lens 1 being not more than 90 degrees.

Figure 2:
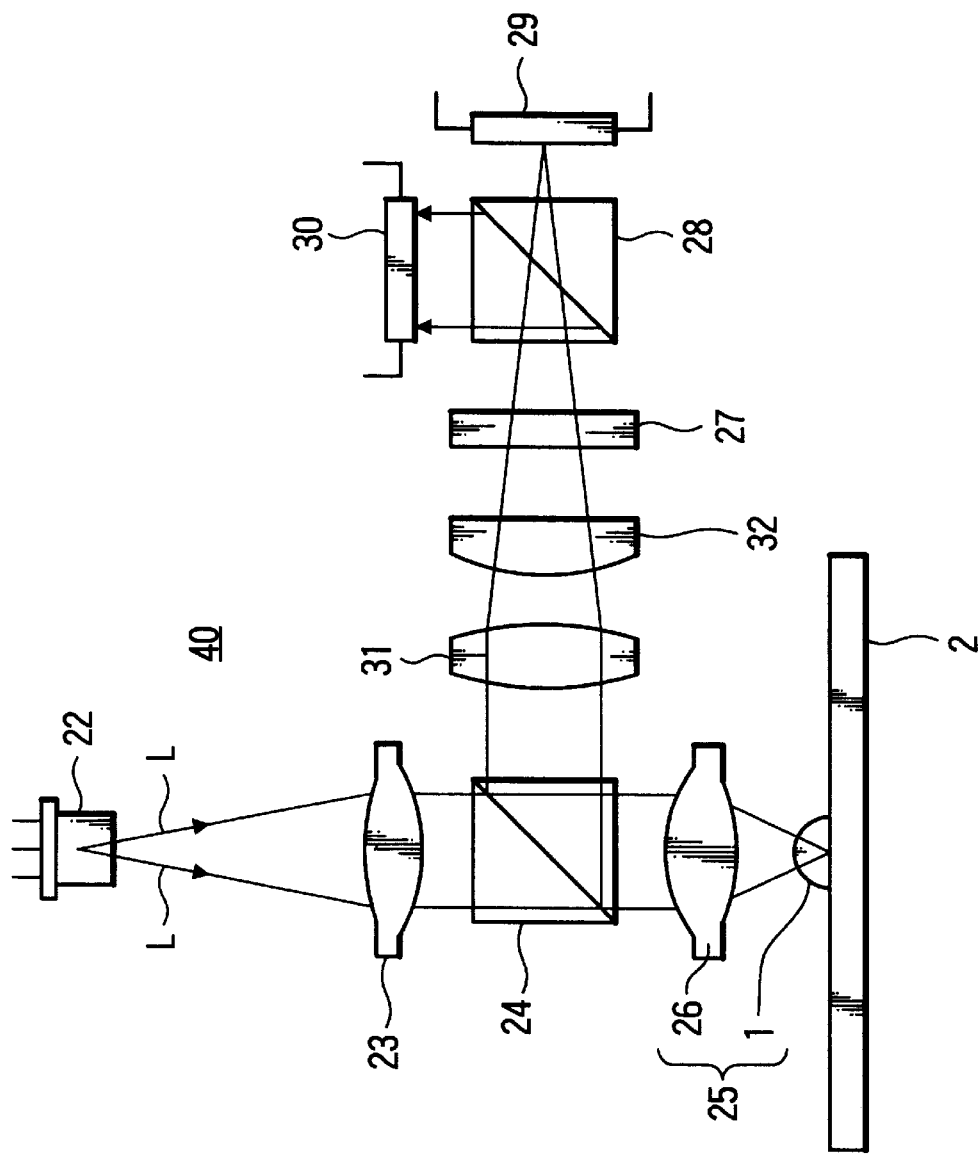
FIG. 2 is a schematic view of a recording and reproducing apparatus for a magneto-optical recording medium according to the present invention.

FIG. 2 shows an example of an optical head 40 using the above-stated magneto-optical recording medium 2 and the convergent lens 2 and a recording and reproducing apparatus comprising the optical head 40.

In FIG. 2, an optical system for performing focusing servo and tracking servo is not shown.

Figure 17:
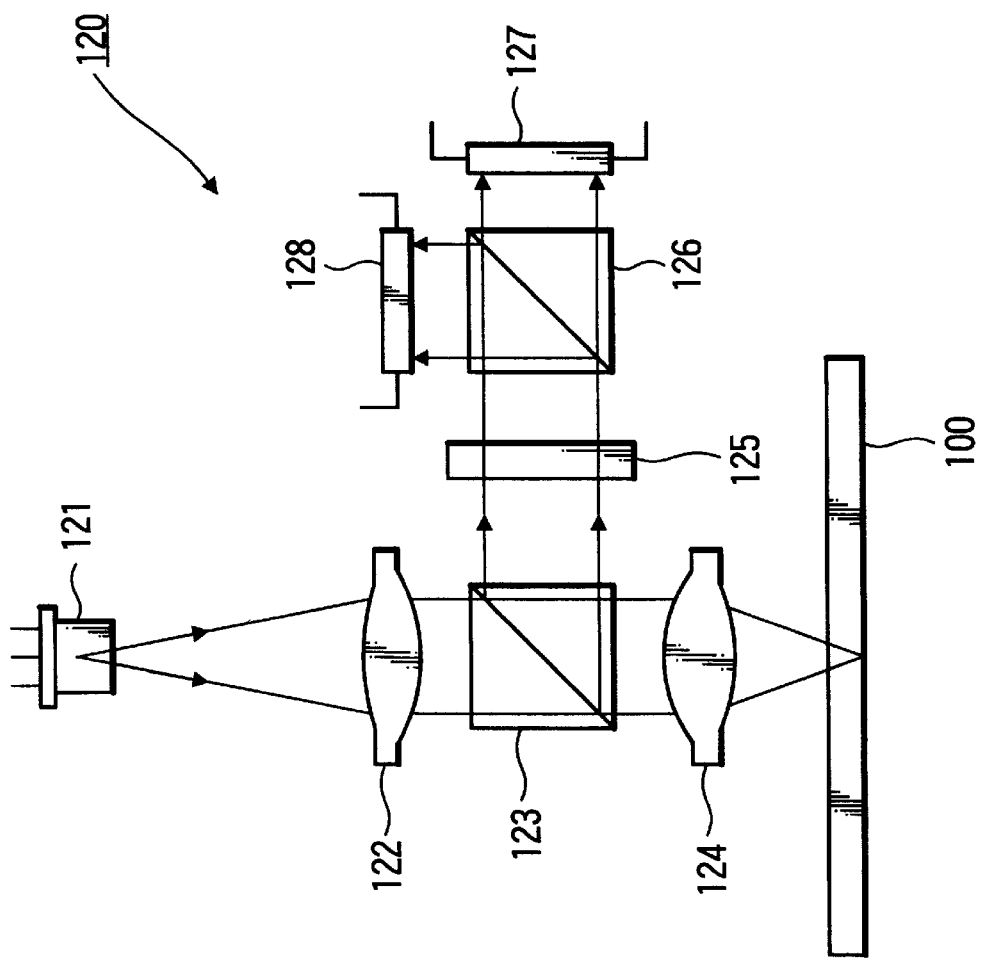
FIG. 17 is a schematic view of a conventional recording and reproducing apparatus.

The optical head 40 and the recording and reproducing apparatus 20 are configured in the same manner as the optical head and recording and reproducing apparatus shown in FIG. 17, respectively, except that two lens, i.e., a convergent lens 1 which is a solid immersion lens and the first lens 26 provided above the convergent lens 1, i.e., at the incidence side of a laser light from a laser light source, are used as a lens group 25 for focusing the laser light L and that a collimator lens 31 and a phase correction plate 32 are arranged between a half-wave plate 27 and a beam splitter 24.

In case of reading a signal recorded on the magneto-optical recording medium 2 using this optical head 40, a laser light L is emitted from the laser light source 22 and incident on the lens group 25 through the collimator lens 23 and the beam splitter 24.

In the lens group 25, the first lens 26 turns a laser light transmitted by the beam splitter 24 to a convergent light and the convergent light is incident on the solid immersion lens, i.e., convergent lens 1 arranged to be opposite to the magneto-optical recording medium 2 and is focused on or in the vicinity of the end face 1a of the convergent lens 1 which face is opposite to the magneto-optical recording medium 2.

Most of the laser light L focused on or in the vicinity of the end face 1a of the convergent lens 1 is totally reflected on the end face 1a of the convergent lens, whereas part of the incident laser light L reaches and is reflected by the multilayer optical thin film 7 of the magneto-optical recording medium 2 as an evanescent light effused from the end face of the convergent lens 1.

Figure 18:
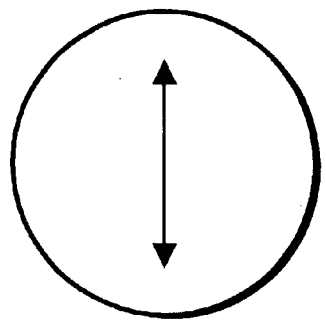
FIG. 18 is a schematic typical view of a linear polarized light.
Figure 19:
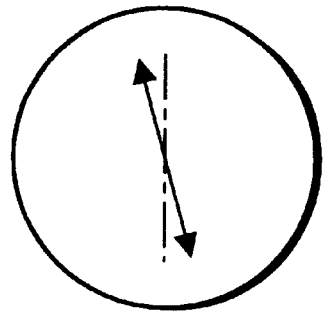
FIG. 19 is a schematic typical view showing a polarization state of a return light.

As can be seen from the above, the return light reflected by and returned from the multilayer optical thin film is influenced by the Kerr effect due to the magnetic film of the information recording layer 5 which is a constitute element of the multilayer optical thin film 7. Then, the return light is Kerr-rotated depending on the magnetization direction of the magnetic film of the information recording layer 5 and the polarization state of the return light is changed as shown in FIGS. 18 and 19. The return light, which passes the convergent lens 1 and the first lens 26 again, is incident on and reflected by the beam splitter 24 and then fetched.

The return light reflected and fetched by the beam splitter 24 is turned into a convergent light by the collimator lens 31. The resultant convergent light is incident on the polarization beam splitter 28 through the phase correction plate 32 and the half-wave plate 27, and split into two polarization components having polarization directions perpendicular to each other by the polarization beam splitter 28.

Among the polarization components split by the polarization beam splitter 28, the component which has transmitted the polarization beam splitter 28 is detected by the first photo-detector 29 and that reflected by the polarization beam splitter 28 is detected by the second photo-detector 30. A magneto-optical signal indicating the magnetization direction of the information recording layer 5 is detected as the difference between the light intensity detected by the first photo-detector 29 and that detected by the second photo-detector 30.

Next, description will be given to the optical distribution of the return light reflected and returned to the first lens 26 in the optical head 40 constituted as stated above.

Figure 3:
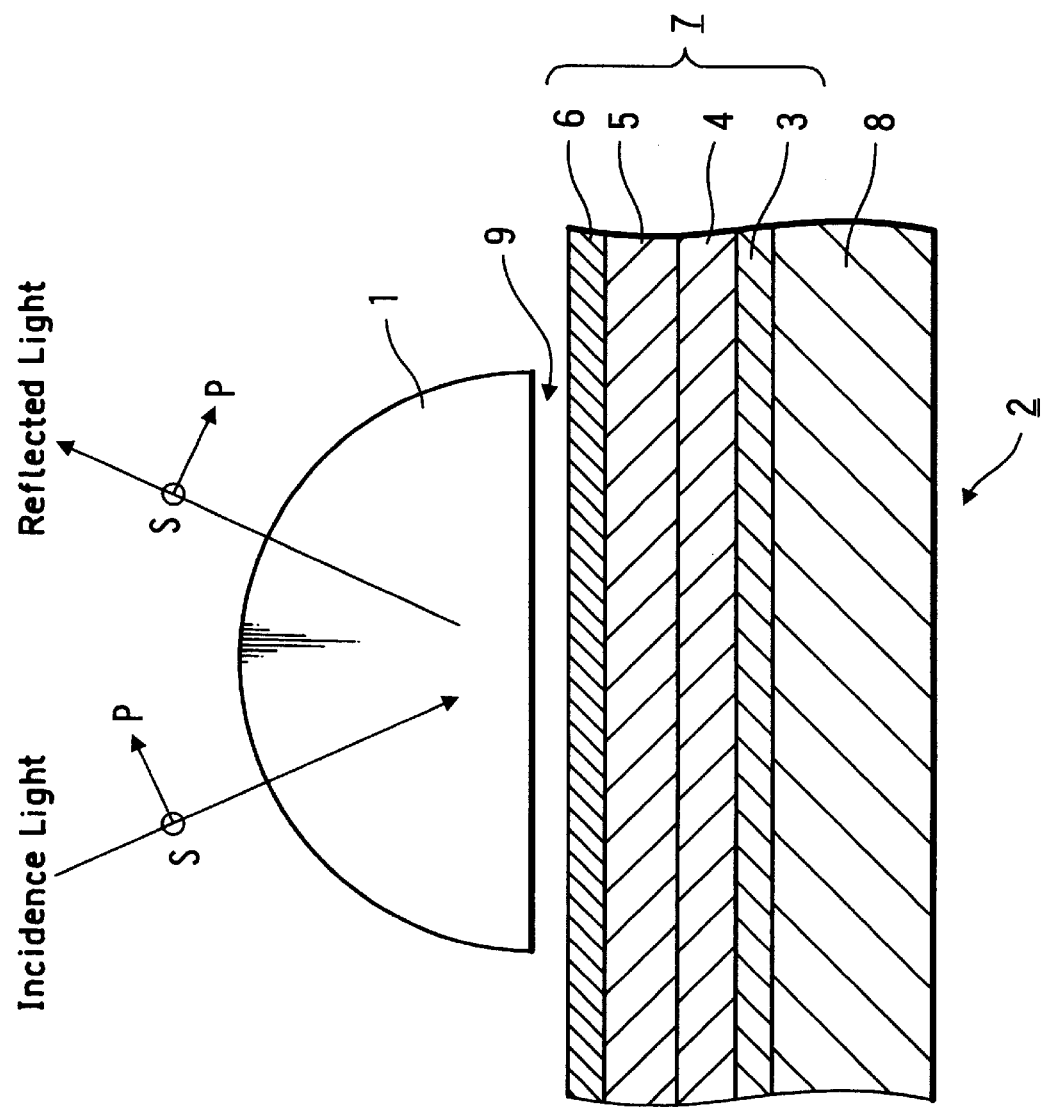
FIG. 3 is a schematic cross-sectional view showing a magneto-optical recording medium according to the present invention, an incidence light and a reflected light.

As shown in FIG. 3, reflected lights generated when a light is incident aslant on the multilayer optical thin film 7 at a certain angle include a P polarization reflected light and an S polarization reflected light. The P polarization reflected light may be generated by reflecting a P polarization incidence component and the S polarization reflected light may be generated by reflecting an S polarization incidence component. Also, the S polarization reflected light may be generated by reflecting a P polarization incidence component and the P polarization reflected light may be generated by reflecting an S polarization incidence component.

In the magneto-optical recording medium according to the present invention, as shown in FIG. 3, at least the metallic reflection layer 3, the back dielectric layer 4, the information recording layer 5 or magneto-optical recording layer and the light transmitting dielectric layer 6 are sequentially provided on the substrate 8. A signal is recorded on and reproduced from the magneto-optical recording medium 3 by the optical head having the convergent lens 1 having a numerical aperture (N. A.) of not less than 1 and by the recording and reproducing apparatus. The film thickness of the second dielectric layer 6 is set at 50 to 80 (nm).

Figure 4:
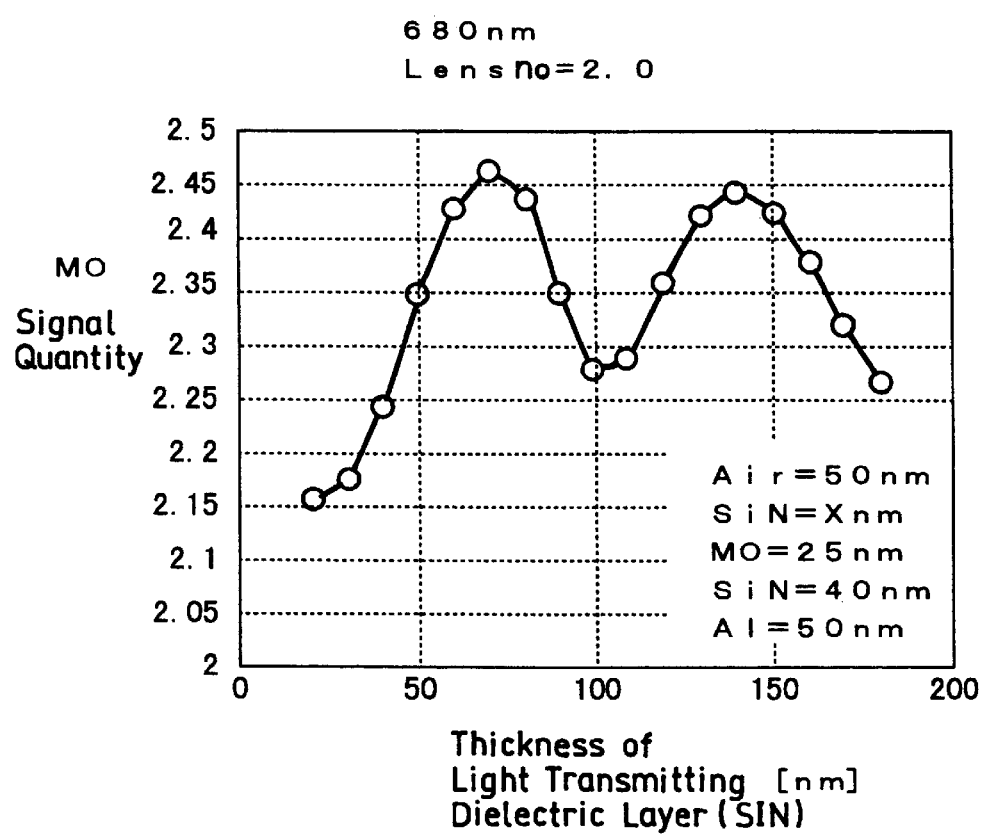
FIG. 4 is a graph showing the relationship between the variation in the thickness of the second dielectric layer and that of the MO signal quantity.
Figure 5:
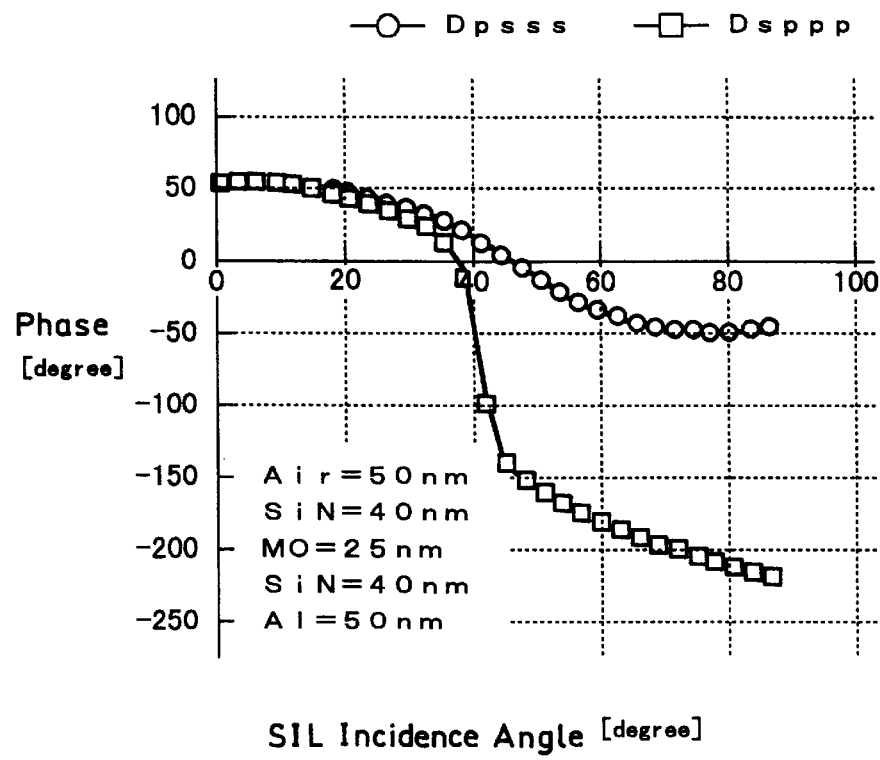
FIG. 5 is a graph showing the relationship between the variation in the SIL incidence angle and that of the signal phase when the thickness of the second dielectric layer is 40 nm.

FIG. 4 shows a state in which the quantity of an MO (magneto-optical) signal is changed when the film thickness of the light transmitting dielectric layer 6 of the magneto-optical recording medium 2 shown in FIG. 3 is changed.

Here, it is set that the wavelength of the laser light is 680 [nm], the refraction index $n_0$ of the convergent lens is 20, the thickness of the information recording layer (magneto-optical recording layer) 5 is 25 [nm], that of the back dielectric layer 4 is 40 [nm], that of the metallic reflection layer 3 is 50 [nm] and that of the air layer 9 is 50 [nm]. In addition, the metallic reflection layer 3 is formed out of Al and the back dielectric layer 4 and the light transmitting dielectric layer 6 are formed out of SiN.

FIG. 4 indicates that the quantity of the MO signal is large when the thickness of the light transmitting dielectric layer 6 is 50 to 80 [nm] and 12 to 150 [nm].

On the other hand, the results of calculating phase variations of the MO signal with respect to the incidence angle for the P polarization incidence signal and the S polarization incidence light if the light transmitting dielectric layer 6 is formed to have a thickness of 40 [nm], 60 [nm], 80 [nm], 100 [nm], 120 [nm] and 140 [nm] are shown in FIGS. 5 to 10, respectively.

It is noted that the phase correction plate 32 shown in FIG. 2 is designed to correct the phase variation.

Figure 6:
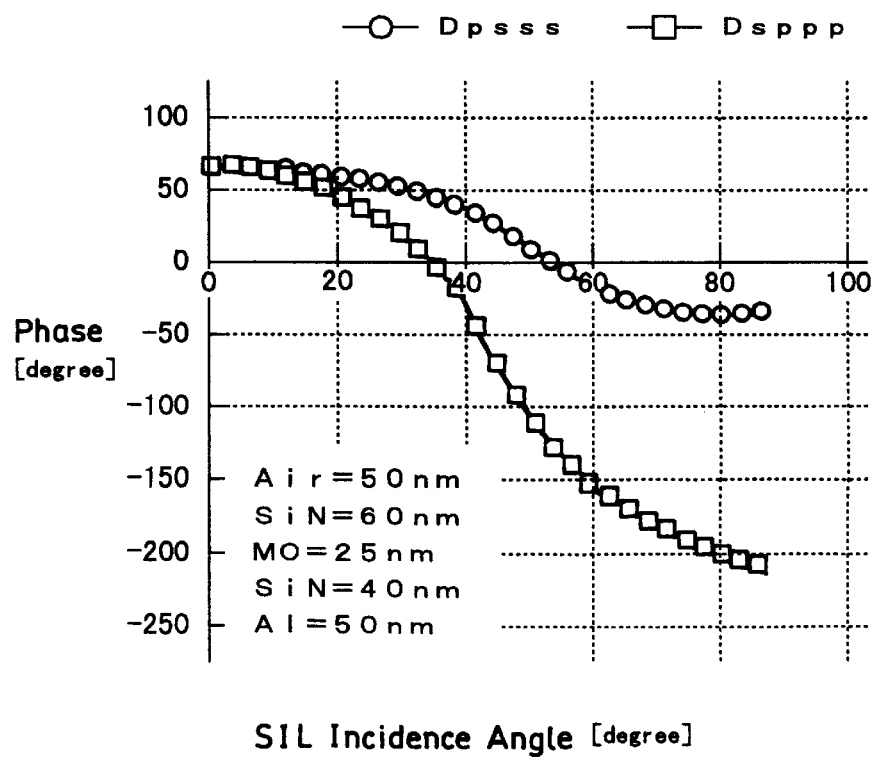
FIG. 6 is a graph showing the relationship between the variation in the SIL incidence angle and that of the signal phase when the thickness of the second dielectric layer is 60 nm.
Figure 7:
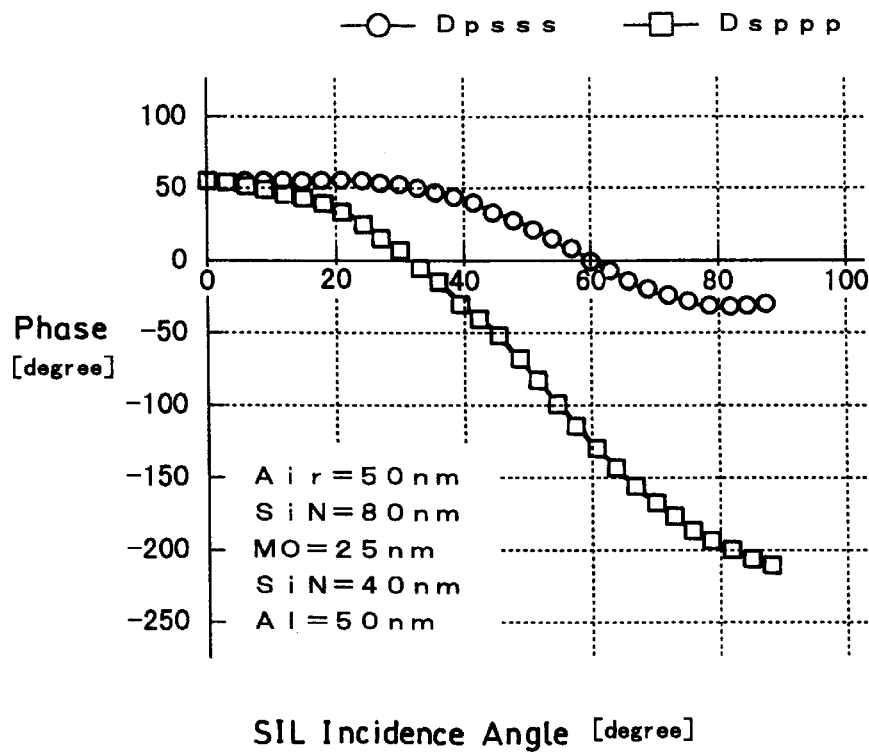
FIG. 7 is a graph showing the relationship between the variation in the SIL incidence angle and that of the signal phase when the thickness of the second dielectric layer is 80 nm.
Figure 8:
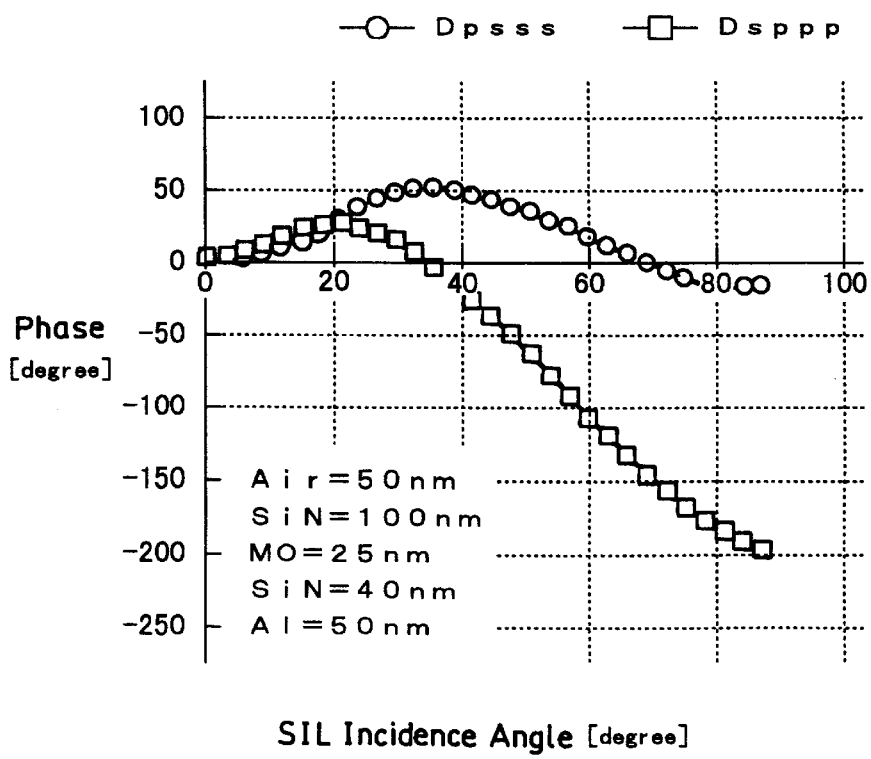
FIG. 8 is a graph showing the relationship between the variation in the SIL incidence angle and that of the signal phase when the thickness of the second dielectric layer is 100 nm.
Figure 9:
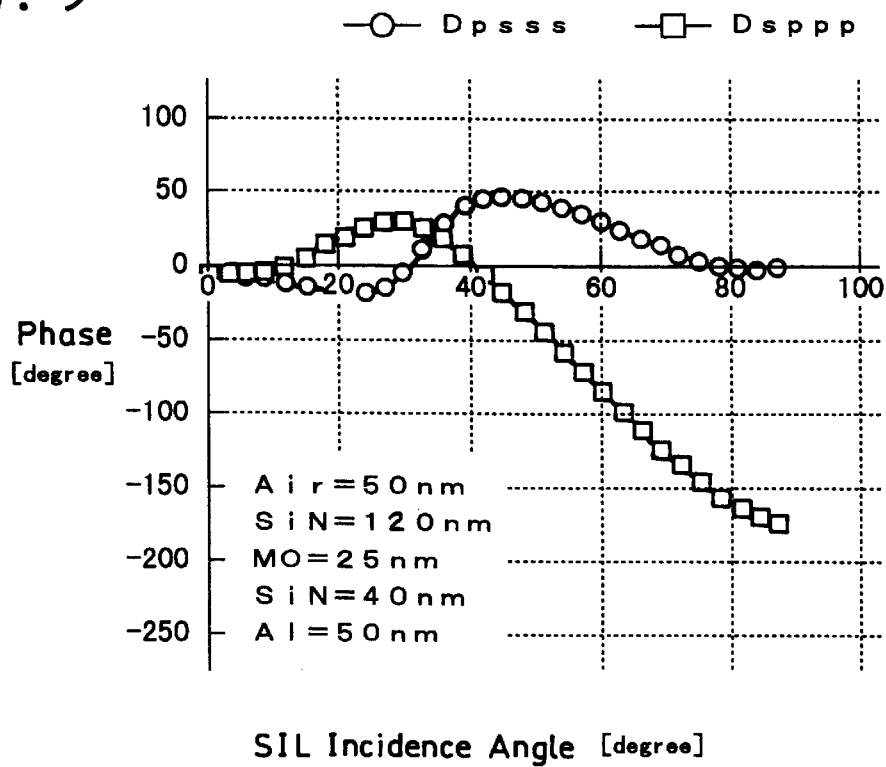
FIG. 9 is a graph showing the relationship between the variation in the SIL incidence angle and that of the signal phase when the thickness of the second dielectric layer is 120 nm.
Figure 10:
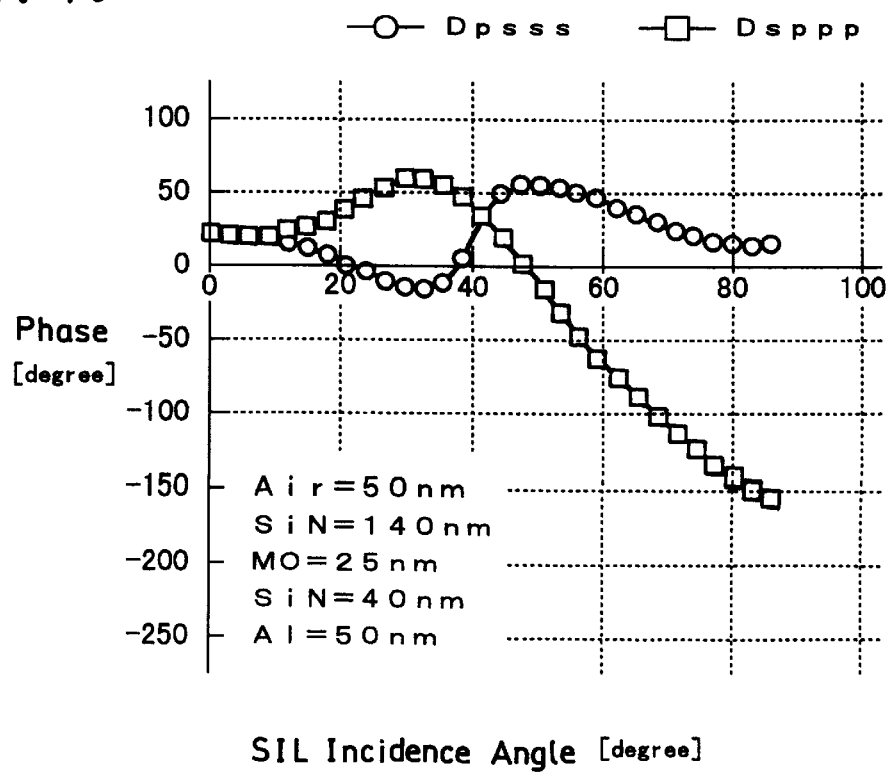
FIG. 10 is a graph showing the relationship between the variation in the SIL incidence angle and that of the signal phase when the thickness of the second dielectric layer is 140 nm.

When the thickness of the light transmitting dielectric layer 6 is 60 [nm] and 80 [nm], the phase varies in a smooth curve manner as shown in FIG. 6 and 7, respectively. When the thickness of the light transmitting dielectric layer 6 is 40 [nm], 100 [nm], 120 [nm] and 140 [nm], however, the manner in which the phase varies becomes more complex as shown in FIGS. 5, 8, 9 and 10, respectively.

If the phase varies in a complex manner as stated above, the phase correction plate 32 shown in FIG. 2 becomes difficult to design.

Based on the result shown in FIG. 4, therefore, the thickness of the light transmitting dielectric layer 6 of the magneto-optical recording medium 2 shown in FIG. 3 is preferably 50 to 80 [nm], more preferably 70 [nm].

Furthermore, in the magneto-optical recording medium according to the present invention, in view of the refraction index $n_0$ of the convergent lens 1, the refraction index n of the dielectric layer in the vicinity of the convergent lens 1 or, in the example shown in FIG. 3, the light transmitting dielectric layer 6 is controlled to be capable of obtaining recording and reproduction signals of high quality.

Figure 11:
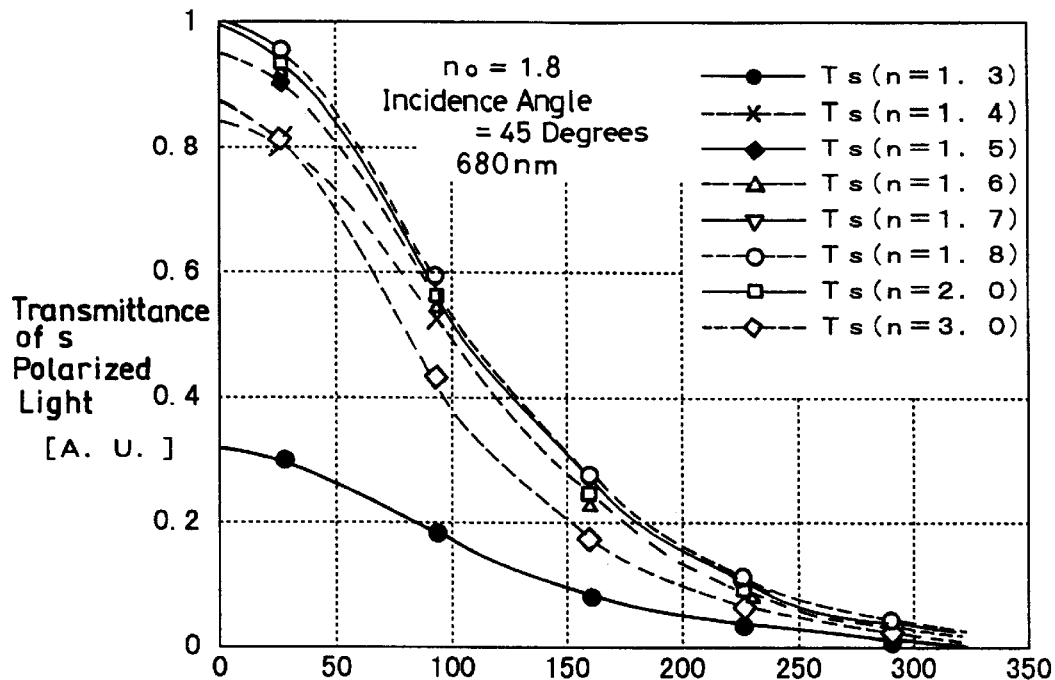
FIG. 11 is a graph showing the relationship between the thickness of the air layer and the transmission factor of the S polarized light component.
Figure 12:
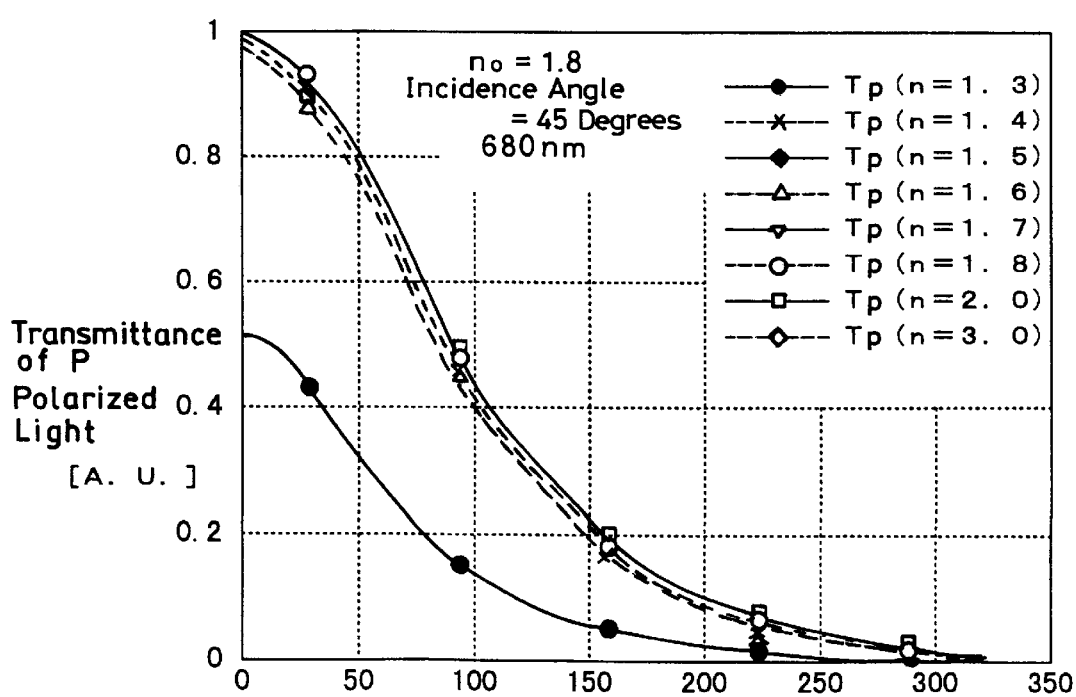
FIG. 12 is a graph showing the relationship between the thickness of the air layer and the transmission factor of the P polarized light component.

FIGS. 11 and 12 show the results of the transmission factor of a laser light having a wavelength of 680 [nm] incident at an incidence angle of 46 degrees (numerical aperture N. A. of 1.3) on the convergent lens 1 constituted by a lens member having a refraction index $n_0$ of 1.8 and (i.e., the ratio of the laser light emitted from the convergent lens 1 and penetrating the magneto-optical recording medium 2) for the S polarized light component and the P polarized light component, respectively.

In FIGS. 11 and 12, the horizontal axis indicates the thickness [nm] of the air layer 9 present between the convergent lens 1 and the magneto-optical recording medium 2.

If the transmission factor of the laser light is noted while the refraction index n of the light transmitting dielectric layer 6 is changed to 1.3, 1.4, 1.5, 1.6, 1.7, 1.8, 2.0 and 3.0, it is found that the transmission factors of both the S polarized light component and the P polarized light component are the highest if the refraction index n of the light transmitting dielectric layer 6 is 1.8, i.e., when the refraction index $n_0$ of the convergent lens becomes equal to that of the light transmitting dielectric layer 6.

In practice, if the refraction index $n_0$ of the convergent lens and the refraction index n of the light transmitting dielectric layer 6 satisfy the relationship of $n_0 \times 0.8 \leq n$, it is possible to obtain high transmission factors of both the S polarized light component and the P polarized light component.

Namely, if the refraction index $n_0$ of the convergent lens is, for example, 1.8 and the refraction index n of the light transmitting dielectric layer 6 is about not less than 1.4, then it is possible to obtain a recording signal and a reproduction signal suitable for the magneto-optical recording medium in practical use as can be understood from FIGS. 11 and 12.

It is noted that the upper limit of the refraction index of a material constituting the light transmitting dielectric layer 6 is about three whose value is practically used. Thus, if the refraction index n0 of the convergent lens and the refraction index n of the dielectric layer 6 satisfy the relationship of $n_0 \times 0.8 \leq n \leq 3$, then it is possible to obtain high transmission factors of both the S polarized light component and the P polarized light component.

Figure 13:
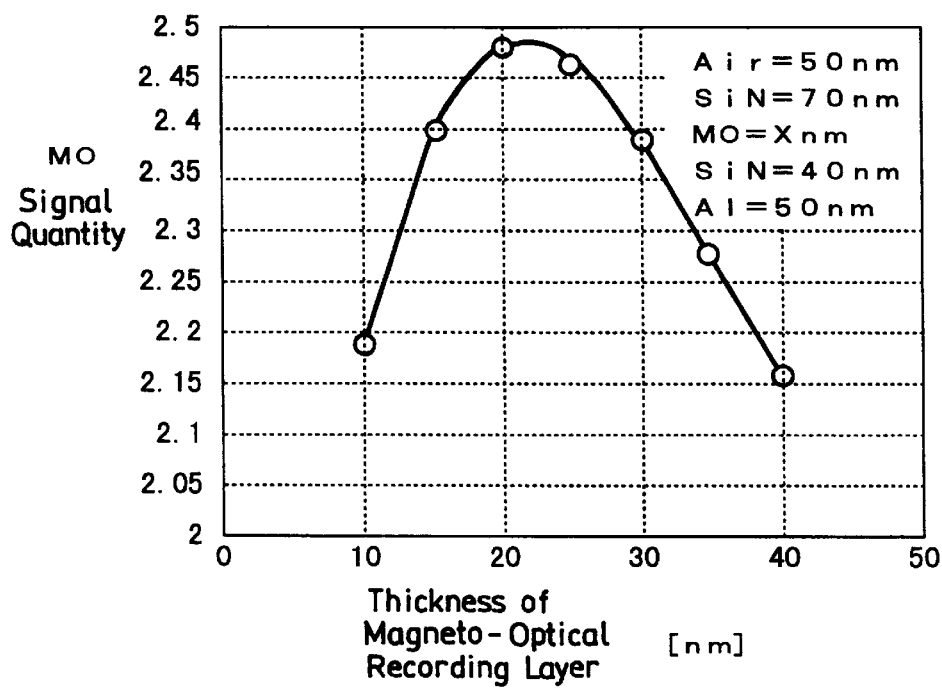
FIG. 13 is a graph showing the relationship between the variation of the thickness of the magneto-optical recording layer and that of the MO signal quantity.

Next, FIG. 13 shows the result of measuring the quantity of an MO signal when the thickness of the information recording layer constituting the magneto-optical recording medium shown in FIG. 3, i.e., the magneto-optical recording layer 5 is changed.

In FIG. 13, the horizontal axis indicates the thickness of the magneto-optical recording layer 5 and the vertical axis indicates the quantity of the MO signal. In this case, it is assumed that the metallic reflection layer 3 made of Al is 50 [nm] thick, the back dielectric layer 4 made of SiN is 40 [nm] thick, the light transmitting dielectric layer 6 made of SiN is 70 [nm] thick and the air layer 9 is 50 [nm] thick.

As shown in FIG. 13, if the thickness of the magneto-optical recording layer 5 is 15 to 30 [nm], the quantity of the MO signal is large and good signal characteristics can be obtained.

Figure 14:
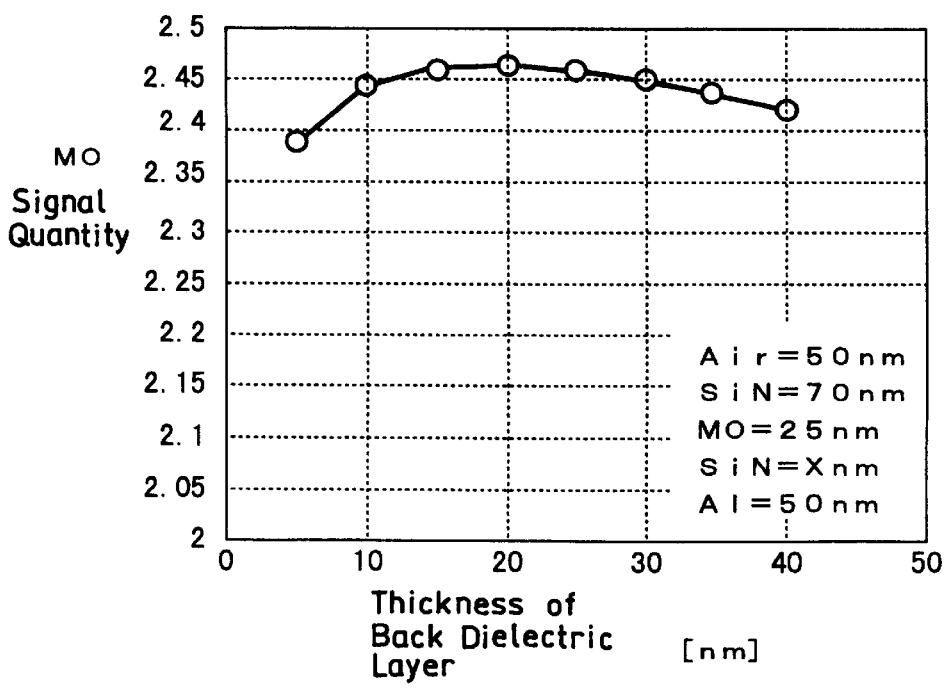
FIG. 14 is a graph showing the relationship between the variation in the thickness of the first dielectric layer and that of the MO signal quantity.

Next, FIG. 14 shows the result of measuring the quantity of an MO signal when the thickness of the back dielectric layer 4 constituting the magneto-optical recording medium shown in 3 is changed.

In FIG. 14, the horizontal axis indicates the thickness the first dielectric layer 4 and the vertical axis indicates quantity of the MO signal. In this case, it is assumed that metallic reflection layer 3 made of Al is 50 [nm] thick, the magneto-optical recording layer 5 made of TbFeCo is 25 [nm] thick, the light transmitting dielectric layer 6 made of SiN is 70 [nm] thick and the air layer 9 is 50 [nm] thick.

As shown in FIG. 14, if the thickness of the back dielectric layer 4 is 20 to 60 [nm], the quantity of the MO signal is large and good signal characteristics can be obtained.

Figure 15:
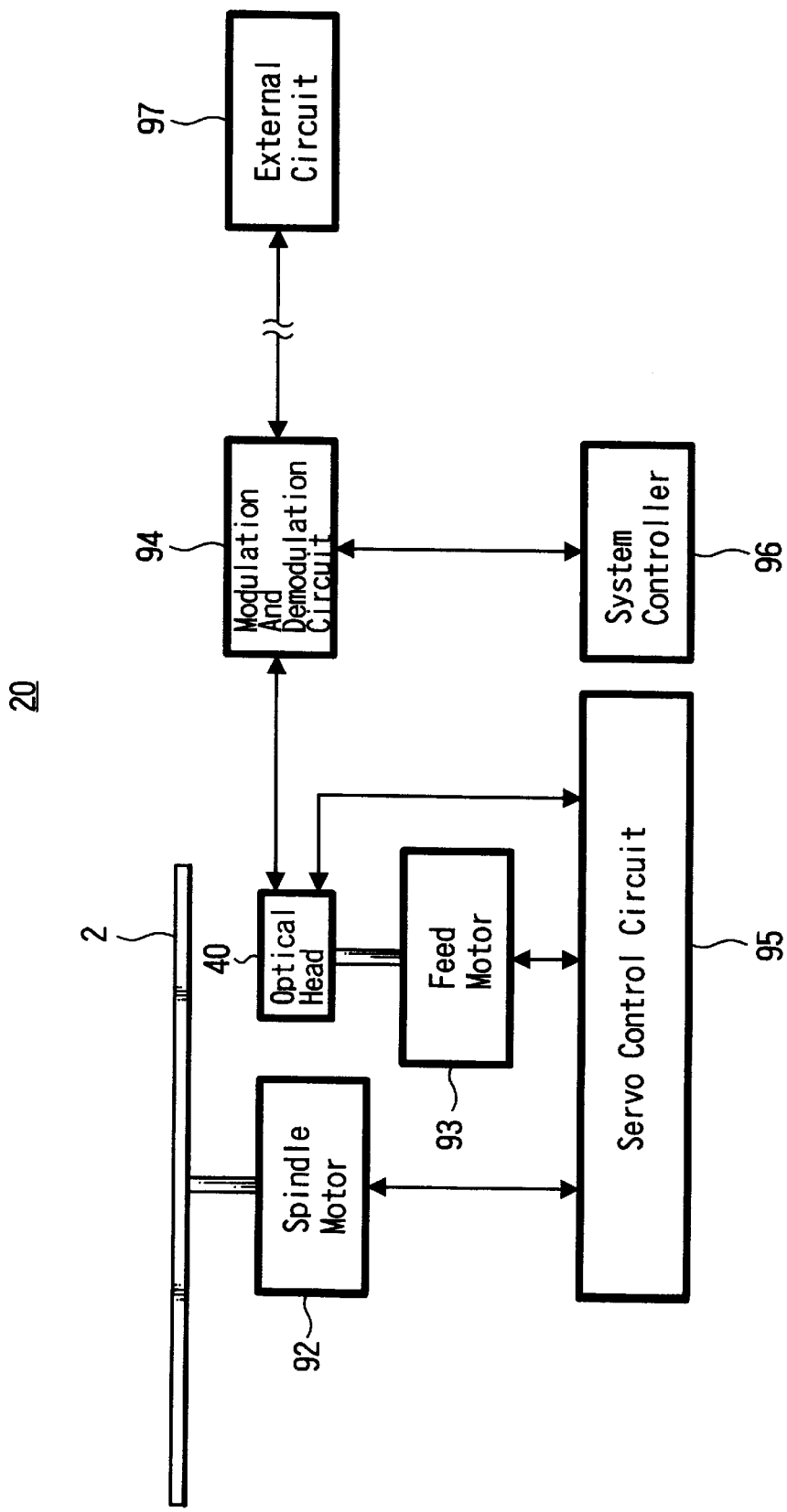
FIG. 15 is a schematic block diagram showing an example of a recording and reproducing apparatus according to the present invention.
Figure 16:
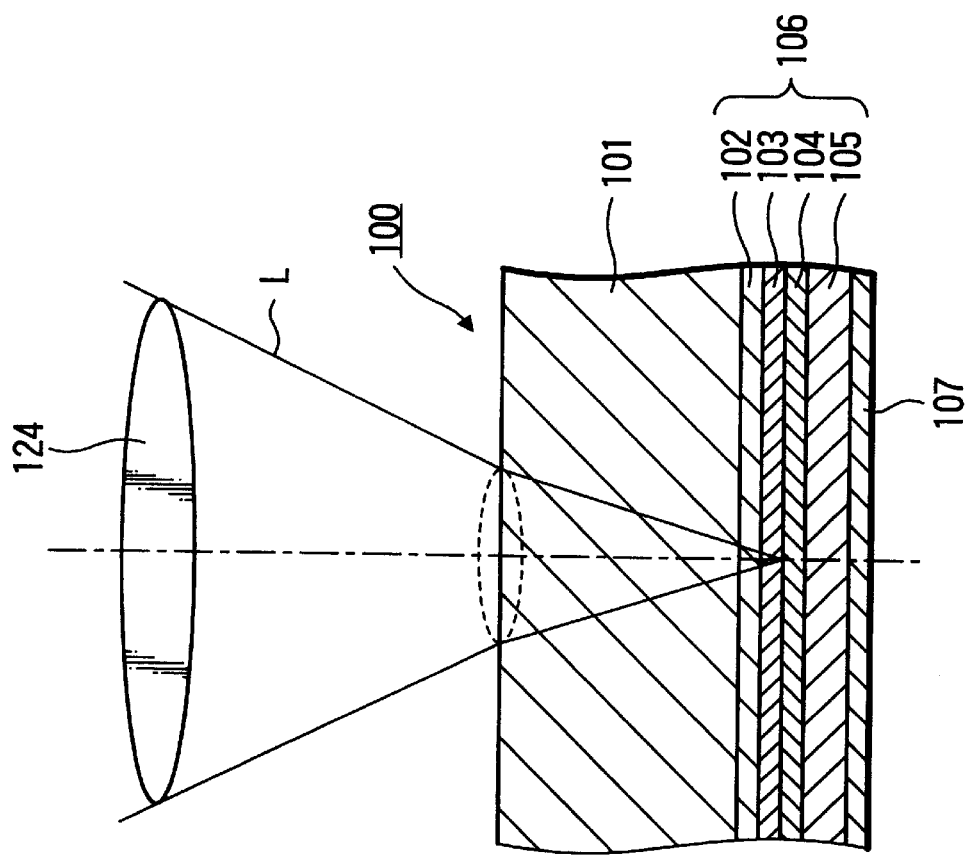
FIG. 16 is a schematic cross-sectional view of a magneto-optical recording medium of conventional structure.

The recording and reproducing apparatus according to the present invention for conducting either recording or reproduction is constituted by the above-stated optical head 40 according to the present invention. FIG. 15 shows an example of the recording and reproducing apparatus. The recording and reproducing apparatus 20 shown therein comprises an optical head 40 to which the present invention is applied, a spindle motor 92 for rotating a magneto-optical recording medium 2, a feed motor 93 for moving the optical head 40, a modulation and demodulation circuit 94 for conducting predetermined modulation and demodulation processings, a servo control circuit 95 for carrying out servo-control and the like of the optical head 40 or the like and a system controller 96 for controlling the overall system.

The spindle motor 92 is controlled by the servo control circuit 95 to be rotated at a predetermined rotation speed. That is, the magneto-optical recording medium 2 for which recording and reproduction operation are performed, is chucked by the spindle motor 92 whose driving is controlled by the servo control circuit 95 and rotated at a predetermined rotation speed by the spindle moor 92.

The optical head 40 irradiates a laser light onto the magneto-optical recording medium 2 when it is driven to rotate at a time of an information signal being recorded and reproduced, and detects the return light of the laser light. The optical head 40 is one to which the present invention is applied and designed to correct the dependency of the phase difference of the return light on the SIL incidence angle.

Additionally, the optical head 40 is connected to the modulation and demodulation circuit 94. When an information signal is reproduced, the optical head 40 irradiates a laser light onto the magneto-optical recording medium 2 which is driven to rotate, detects a magneto-optical signal from the return light of the laser light and supplies the detected magneto-optical signal to the modulation and demodulation circuit 94.

When an information signal is recorded, the signal which has been inputted from an external circuit 97 and subjected to a predetermined modulation processing by the modulation and demodulation circuit 94 is supplied to the optical head 40. The optical head 40 irradiates a laser light onto the magneto-optical recording medium 2 based on the signal supplied from the modulation and demodulation circuit 94.

The optical head 40 is also connected to the servo control circuit 95. When an information signal is recorded and reproduced, the optical head 40 generates a focusing servo signal and a tracking servo signal from the return light reflected by and returned from the rotation-driven magneto-optical recording medium 2 and supplies these servo signals to the servo control circuit 95.

The modulation and demodulation circuit 94 is connected to the system controller 96 and the external circuit 97. When an information signal is recorded on the magneto-optical recording medium 2, the modulation and demodulation circuit 94 receives the signal to be recorded on the magneto-optical recording medium 2 from the external circuit 97 under the control of the system controller 96 and conducts a predetermined modulation processing to the signal. The signal modulated by the modulation and demodulation circuit 94 is supplied to the optical head 40.

When an information signal is reproduced from the magneto-optical recording medium 2, the modulation and demodulation circuit 94 receives a magneto-optical signal reproduced from the magneto-optical recording medium 2 from the optical head 40 and conducts a predetermined demodulation processing to the signal under the control of the system controller 96. The signal demodulated by the modulation and demodulation circuit 94 is outputted from the demodulation and demodulation circuit 94 to the external circuit 97.

The feed motor 93 feeds the optical head 40 to a predetermined position in the diameter direction of the magneto-optical recording medium 2 when an information signal is recorded and reproduced. The feed motor 93 is driven based on a control signal from the servo control circuit 95. Namely, the feed motor 93 is connected to the servo control circuit 95 and controlled by the servo control circuit 95.

The servo control circuit 95 controls the feed motor 93 so that the optical head 40 can be fed to a predetermined position opposite to the magneto-optical recording medium 2 under the control of the system controller 96. The servo control circuit 95 is also connected to the spindle motor 92 and controls the operation of the spindle motor under the control of the system controller 96. Namely, the servo control circuit 95 controls the spindle motor 92 so that the magneto-optical recording medium 2 is driven to be rotated at a predetermined rotating speed when an information signal is recorded and reproduced.

The servo control circuit 95 is also connected to the optical head 40. When an information signal is recorded and reproduced, the servo control circuit 95 receives a servo signal from the optical head 40 and controls focusing servo and tracking servo for the optical head 40 based on the servo signal. The focusing servo and tracking servo for the optical head 40 is conducted by, for example, mounting the objective lens of the optical head on a biaxial actuator and finely moving the objective lens by means of the biaxial actuator.

In the above-stated recording and reproducing apparatus 20, the optical head to which the present invention is applied is used as the optical head 40, so that a high quality signal can be obtained while increasing the numerical aperture of the objective lens using the solid immersion lens.

The magneto-optical recording medium, the optical head and the recording and reproducing apparatus according to the present invention should not be limited to the above-stated examples. They can be constituted by combining the conventionally known structures. In addition, the material of the dielectric layer constituting the magneto-optical recording medium according to the present invention should not be limited to the above-stated one. Conventionally known dielectrics can be appropriately used. Namely, $Si_3N_4$, SiN, $SiO_2$, ZnS, MgO, $Ta_2O_3$ and the like are available.

According to a magneto-optical recording medium of the present invention, i.e., a magneto-optical recording medium for which at least one of recording and reproduction is conducted by irradiating a light onto the magneto-optical recording medium through a convergent lens having a numerical aperture (N. A.) of not less than 1, wherein the magneto-optical recording medium has at least a metallic reflection layer, a back dielectric layer, a magneto-optical recording layer and a light transmitting dielectric layer sequentially provided on a substrate, and is irradiated with the light from a side of the light transmitting dielectric layer; and the light transmitting dielectric layer has a thickness of 50 to 80 nm, it is possible to detect a high quality signal from a return light reflected by and returned from the magneto-optical recording medium.

It is also possible to obtain a magneto-optical recording medium for which phase variations of both the P polarized light component and the S polarized light component of a laser light can be easily adjusted and to obtain a magneto-optical recording medium allowing to obtain a large quantity of an MO signal as well as to have excellent signal characteristics.

Further, according to a magneto-optical recording medium of the present invention, i.e., a magneto-optical recording medium having the refraction index n of the light transmitting dielectric layer selected to satisfy the relationship of $n_0 \times 0.8 < n$ with the refraction index $n_0$ of the convergent lens, it is possible to detect a high quality signal from a return light.

It is also possible to obtain a magneto-optical recording medium for which phase variations of both the P polarized light component and the S polarized light component of a laser light can be easily adjusted and to obtain a magneto-optical recording medium allowing to obtain a large quantity of an MO signal as well as to have excellent signal characteristics.

Moreover, by allowing the relationship of $n_0 \times 0.8 < n$ to be satisfied by the refraction index $n_0$ of the convergent lens and the refraction index n of the dielectric layer, it is possible to obtain a magneto-optical recording medium allowing to obtain high transmission factors of both the p polarized light component and the S polarized component of the laser light and to thereby obtain a good recording signal as well as a good reproduction signal.

Furthermore, according to an optical head of the present invention, i.e., an optical head including a convergent lens having a numerical aperture (N. A.) of not less than 1, wherein the optical head conducts at least one of recording and reproduction with respect to a magneto-optical recording medium having at least a metallic reflection layer, a back dielectric layer, a magneto-optical recording layer and a light transmitting dielectric layer sequentially provided on a substrate, by irradiating a light onto the magneto-optical recording medium having the light transmitting dielectric layer of the thickness of 50 to 80 nm from a side of the light transmitting dielectric layer through the convergent lens, it is possible to detect a high quality signal from a return light of the laser light irradiated onto the magneto-optical recording medium.

Additionally, an optical head of the present invention, i.e., an optical head for conducting at least one of recording and reproduction with respect to a magneto-optical recording medium having a refraction index n of a light transmitting dielectric layer selected to satisfy a relationship of $n_0 \times 0.8 \leq n$ with a refraction index $n_0$ of the convergent lens, by irradiating a light onto the magneto-optical recording medium from a side of the light transmitting dielectric layer through a convergent lens, it is possible to detect a high quality signal from the return light of the laser light irradiated onto the magneto-optical recording medium.

Moreover, by allowing the relationship of $n_0 \times 0.8 \leq n$ to be satisfied by the refraction index $n_0$ of the convergent lens and the refraction index n of the dielectric layer, it is possible to obtain high transmission factors of both the P polarized light component and the S polarized light component of the laser light and to thereby obtain a good recording signal and a good reproduction signal.

In addition, according to the recording and reproducing apparatus of the present invention comprising the optical head of the present invention, it is possible to detect a high quality signal from the return light of the laser light irradiated onto the magneto-optical recording medium.

Moreover, by allowing the relationship of $n_0 \times 0.8 \leq n$ to be satisfied by the refraction index $n_0$ of the convergent lens and the refraction index n of the dielectric layer, it is possible to obtain high transmission factors of both the P polarized light component and the S polarized light component of the laser light and to thereby obtain a good recording signal and a good reproduction signal.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. In a magneto-optical recording medium system to conduct at least one of recording and reproduction by irradiating a light onto a magneto-optical recording medium through a convergent lens having a numerical aperture (N. A.) of not less than 1, the magneto-optical recording medium comprising:

a substrate;

a metallic reflection layer;

a back dielectric layer;

a magneto-optical recording layer; and a light transmitting dielectric layer, where the metallic reflection layer, the back dielectric layer, the magneto-optical recording layer, and the light transmitting dielectric layer are sequentially provided on the substrate and are adapted to be irradiated with the light from a side of the light transmitting dielectric layer and where the light transmitting dielectric layer defines a thickness of 50 to 80 nanometers (nm).

2. In a magneto-optical recording medium system to conduct at least one of recording and reproduction by irradiating a light onto a magneto-optical recording medium through a convergent lens having a numerical aperture (N. A.) of not less than 1, the magneto-optical recording medium comprising:

a substrate;

a metallic reflection layer;

a back dielectric layer;

a magneto-optical recording layer; and a light transmitting dielectric layer, where the metallic reflection layer, the back dielectric layer, the magneto-optical recording layer, and the light transmitting dielectric layer are sequentially provided on the substrate and where the light transmitting dielectric layer defines a refraction index n, where the refraction index n satisfies a relationship of $n_0 \times 0.8 \leq n$ with a refraction index $n_0$ of the convergent lens.

3. The magneto-optical recording medium as claimed in claim 1, wherein a refraction index n of the light transmitting dielectric layer satisfies a relationship of $n_0 \times 0.8 \leq n \leq 3$ with a refraction index $n_0$ of the convergent lens.

4. The magneto-optical recording medium as claimed in claim 2, wherein a refraction index of the light transmitting dielectric layer satisfies a relationship of $n_0 \times 0.8 \leq n \leq 3$.

5. The magneto-optical recording medium as claimed in claim 1, wherein the light transmitting dielectric layer is made of SiN.

6. The magneto-optical recording medium as claimed in claim 2, wherein the light transmitting dielectric layer is made of SiN.

7. The magneto-optical recording medium as claimed in claim 1, wherein the light transmitting dielectric layer defines a thickness of 15 to 30 nanometers (nm).

8. The magneto-optical recording medium as claimed in claim 2, wherein the light transmitting dielectric layer defines a thickness of 15 to 30 nanometers (nm).

9. The magneto-optical recording medium as claimed in claim 1, wherein the back dielectric layer is made of SiN and defines a thickness of 20 to 60 nanometers (nm).

10. The magneto-optical recording medium as claimed in claim 2, wherein the back dielectric layer is made of SiN and defines a thickness of 20 to 60 nanometers (nm).

11. A system, comprising:

an optical head including a convergent lens having a numerical aperture (N. A.) of not less than 1; and a magneto-optical recording medium having at least a metallic reflection layer, a back dielectric layer, a magneto-optical recording layer and a light transmitting dielectric layer sequentially provided on a substrate, where the light transmitting dielectric layer defines a thickness of 50 to 80 nanometers (nm), and where the optical head is adapted to conduct at least one of recording and reproduction with respect to the magneto-optical recording medium by irradiating a light onto the magneto-optical recording medium from a side of the light transmitting dielectric layer through the convergent lens.

12. A system, comprising:

an optical head including a convergent lens having a numerical aperture (N. A.) of not less than 1; and a magneto-optical recording medium having at least a metallic reflection layer, a back dielectric layer, a magneto-optical recording layer and a light transmitting dielectric layer sequentially provided on a substrate, where a refraction index n of the light transmitting dielectric layer satisfies a relationship of $n_0 \times 0.8 \leq n$ with a refraction index $n_0$ of the convergent lens, where the optical head is adapted to conduct at least one of recording and reproduction with respect to the magneto-optical recording medium by irradiating a light onto the magneto-optical recording medium from a side of the light transmitting dielectric layer through the convergent lens.

13. The system as claimed in claim 11, wherein a refraction index of the light transmitting dielectric layer of the magneto-optical recording medium satisfies a relationship of $n_0 \times 0.8 \leq n \leq 3$ with a refraction index $n_0$ of the convergent lens.

14. The system as claimed in claim 12, wherein a refraction index of the light transmitting dielectric layer of the magneto-optical recording medium satisfies a relationship of $n0 \times 0.8 \leq n \leq 3$.

15. A recording and reproducing apparatus comprising:

an optical head including a convergent lens having a numerical aperture (N. A.) of not less than 1; and a magneto-optical recording medium having at least a metallic reflection layer, a back dielectric layer, a magneto-optical recording layer, and a light transmitting dielectric layer sequentially provided on a substrate, where the light transmitting dielectric layer defines a thickness of 50 to 80 nanometers (nm) and where the optical head is adapted to conduct at least one of recording and reproduction by irradiating a light onto the magneto-optical recording medium from a side of the light transmitting dielectric layer through the convergent lens.

16. A recording an d reproducing apparatus comprising:

an optical head including a convergent lens having a numerical aperture (N. A.) of not less than 1; and a magneto-optical recording medium having at least a metallic reflection layer, a back dielectric layer, a magneto-optical recording layer and a light transmitting dielectric layer sequentially provided on a substrate, where a refraction index n of the light transmitting dielectric layer satisfies a relationship of $n_0 \times 0.8 \leq n$ with a refraction index $n_0$ of the convergent lens, and where the optical head is adapted to conduct at least one of recording and reproduction by irradiating a light onto the magneto-optical recording medium from a side of the light transmitting dielectric layer through the convergent lens.

17. The recording and reproducing apparatus as claimed in claim 15, wherein a refraction index of the light transmitting dielectric layer of the magneto-optical recording medium satisfies a relationship of $n_0 \times 0.8 \leq n \leq 3$ with a refraction index $n_0$ of the convergent lens.

18. The recording and reproducing apparatus as claimed in claim 16, wherein a refraction index of the light transmitting dielectric layer of the magneto-optical recording medium satisfies a relationship of $n_0 \times 0.8 \leq n \leq 3$.

* * * * *